US010783600B2

(12) United States Patent
Zachary (10) Patent No.: US 10,783,600 B2
(45) Date of Patent: Sep. 22, 2020

(54) METHOD AND SYSTEM USING A BLOCKCHAIN DATABASE FOR DATA EXCHANGE BETWEEN VEHICLES AND ENTITIES

(71) Applicant: GM GLOBAL TECHNOLOGY OPERATIONS LLC, Detroit, MI (US)

(72) Inventor: Christopher L. Zachary, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 589 days.

(21) Appl. No.: 15/605,677

(22) Filed: May 25, 2017

(65) Prior Publication Data

US 2018/0342036 A1 Nov. 29, 2018

(51) Int. Cl.
*G06Q 50/30* (2012.01)
*H04W 4/44* (2018.01)
(Continued)

(52) U.S. Cl.
CPC ......... *G06Q 50/30* (2013.01); *G06Q 30/0265* (2013.01); *H04L 9/0637* (2013.01);
(Continued)

(58) Field of Classification Search
CPC ...... G06Q 50/30; G06Q 30/0265; H04W 4/44
(Continued)

(56) References Cited

U.S. PATENT DOCUMENTS 6,526,335 B1 * 2/2003 Treyz .................. G01C 21/26
701/1
9,307,383 B1 * 4/2016 Patrick .................. H04W 4/90
(Continued)

FOREIGN PATENT DOCUMENTS

WO  WO-2018063605 A1 * 4/2018 ............ G06F 21/64

OTHER PUBLICATIONS

Deloitte. "Accelerating technology disruption in the automotive market Blockchain in the automotive industry". Published 2018. https://www2.deloitte.com/content/dam/Deloitte/cn/Documents/consumer-business/deloitte-cn-consumer-blockchain-in-the-automotive-industry-en-180809.pdf (Year: 2018).*

(Continued)

*Primary Examiner* — Shannon S Campbell
*Assistant Examiner* — Lisa Ma
(74) *Attorney, Agent, or Firm* — Lorenz & Kopf LLP (57) ABSTRACT

A method and system using blockchains for distributing event information related to vehicle operation between a plurality of entities. The method includes executing blockchain agreements between the plurality of entities participating in a blockchain exchange for distributing event information related to the vehicle operation, where the blockchain exchange includes a plurality of databases having blockchains of data blocks for storing the event information. Next, generating by a particular entity of the plurality of entities the event information related to vehicle operation and validating the event information by a consensus of the plurality of entities participating in the blockchain exchange. Then, appending, upon validating by the consensus, a blockchain within the blockchain database for enabling each entity to have access to a same replicated block data with the event information to enable enhanced vehicle operations of multiple vehicles based on the same replicated block data.

20 Claims, 8 Drawing Sheets

(51) Int. Cl.
  *H04L 9/06* (2006.01)
  *G06Q 30/02* (2012.01)
  *H04W 12/10* (2009.01)
  *H04L 9/32* (2006.01)

(52) U.S. Cl.
  CPC ............ *H04L 9/3239* (2013.01); *H04W 4/44* (2018.02); *H04W 12/10* (2013.01); *H04L 2209/38* (2013.01)

(58) Field of Classification Search
  USPC .......................................................... 705/13
  See application file for complete search history.

(56) References Cited

U.S. PATENT DOCUMENTS

| | | | | |
|---|---|---|---|---|
| 2003/0130989 | A1* | 7/2003 | Kaufman | G06Q 30/02 |
| 2017/0140408 | A1* | 5/2017 | Wuehler | G06Q 30/0207 |
| 2018/0239350 | A1* | 8/2018 | Cantrell | G05D 1/0038 |
| 2018/0270244 | A1* | 9/2018 | Kumar | B64C 39/024 |
| 2018/0374283 | A1* | 12/2018 | Pickover | G07C 5/085 |
| 2019/0287199 | A1* | 9/2019 | Messerges | G06F 16/27 |
| 2020/0074853 | A1* | 3/2020 | Miller | H04W 4/40 |
| 2020/0127812 | A1* | 4/2020 | Schuler | H04L 63/20 |

OTHER PUBLICATIONS

Nash, Kim S., "Toyota Demonstrates Blockchain Apps for the Car Business," the Wall Street Journal, May 24, 2017, retrieved from the Internet on May 24, 2017 at https://blogs.wsj.com/cio/2017/05/24/toyota-demonstrates-blockchain-apps-for-the-car-business/.

* cited by examiner

METHOD AND SYSTEM USING A BLOCKCHAIN DATABASE FOR DATA EXCHANGE BETWEEN VEHICLES AND ENTITIES

TECHNICAL FIELD

Embodiments of the subject matter described herein relate generally to blockchains in online ledgers for exchanging data with participants of events for access by autonomous and non-autonomous vehicles or the like to receive data relating to temporal events provided in the online ledger where the ledger entries require validations by participants of the exchange.

BACKGROUND

Blockchain technology while associated with use in the financial sector has applicability to the non-financial sector and in this case, for use with autonomous and non-autonomous vehicle technologies. Briefly, a blockchain is a distributed database of records, essentially it is an online ledger of transactions when used in the financial industry and is executed and shared among participants of a blockchain exchange. Each transaction is verified by a consensus of the participants which allows for a failure proof validation system prior to the data being entered, and further no corruption of the entered data because the transaction information can never be erased and not easily modified. Currently, bitcoin, the digital currency is an accepted decentralized digital currency which relies on blockchain technology and the use of consensus validation when transactions of bitcoins are too be entered onto an online ledger.

Fundamental to the blockchains systems is the reliance on a trusted authority, that is, all transactions rely on trusting numbers of persons of group to tell the truth when making decisions about the validity of a transaction. Blockchain accomplishes this feat, by enabling a distributed consensus of trust where all transactions can be verified in the future by participants of the blockchain exchange without compromising privacy. That said, this fundamental aspect of group validation through trust has applicability in blockchain technology applications when providing temporal event information to autonomous vehicles which require high degrees of integrity of the temporal event data for vehicle operations.

It is desirable to use blockchain technology in autonomous vehicle technologies (AVT) related to temporal events to produce a blockchain ledger to enable interaction with highway and traffic management systems and participants in vehicle driving operations.

It is desirable to use different data types in an online or cloud blockchain ledger for entering and distributing to participants, information from the National Highway Transportation Safety Administration (NHTSA) of temporal happenings such as identified events, vehicle status, vehicle identification and vehicle related resources and services.

It is desirable to provide information about behavioral competencies of users of autonomous vehicles by creating an online blockchain ledger of entries related to vehicle actions, driver behavior and driver abilities to follow traffic rules.

It is desirable to provide locations information and densities of vehicles in regions in an online blockchain ledger for interoperable information sharing between vehicles of participants for use in navigating routes.

It is desirable to implement an advertising and subscription model for participants accessing temporal event data using a blockchain exchange in conjunction with the online ledger for operating autonomous, semi-autonomous and non-autonomous vehicles.

It is desirable to implement a common blockchain exchange for municipalities, regional authorities, and public facilities (airports) to determine validity of permits and licenses to operate as hacks, taxis, or other for-hire services.

It is desirable to implement a blockchain exchange to push only approved, vetted, and secure, location based information to the occupants of an autonomous vehicle such as advertising, parking availability, charging or refueling information, and other location based information.

It is desirable to have a trusted and proven financial platform for identifying, charging, and maintaining balances for autonomous vehicles that incur charges related to tolls, parking, car washes, and access to other fee based services for autonomous vehicles.

Current systems may not always provide adequate solutions for a secure, robust and data distribution and interoperable exchange between participants and data providers. Accordingly, it is desirable to provide systems and methods which address these shortcomings. Furthermore, other desirable features and characteristics of the present invention will become apparent from the subsequent detailed description of the invention and the appended claims, taken in conjunction with the accompanying drawings and this background of the invention.

BRIEF SUMMARY

A method and systems using blockchains for distributing event information related to vehicle operation between a plurality of entities is provided.

In one example, the method includes executing blockchain agreements between the plurality of entities participating in a blockchain exchange for distributing event information related to the vehicle operation wherein the blockchain exchange includes a plurality of databases includes blockchains of data blocks for storing the event information. Then, generating, by a particular entity of the plurality of entities, the event information related to vehicle operation and subsequently configuring the event information into a data block for entry into the blockchain exchange. Further, validating the event information by a consensus of the plurality of entities participating in the blockchain exchange prior to entry into the blockchain exchange. Finally, appending, upon validating by the consensus, a blockchain within the blockchain database by adding the data block with the event information, and further replicating and storing in multiple blockchains of other databases of the plurality of databases the data block for enabling each entity to have access to a same replicated block data with the event information to enable enhanced vehicle operations of multiple vehicles based on the same replicated block data.

Further, in one example, the method includes removing, if not validated by consensus, the event information related to vehicle operation and further removing data blocks with the event information not validated from the blockchains in the blockchain exchange and replicated data blocks from the plurality of databases of blockchains associated with the plurality of entities to prevent operation of the vehicles based on the event information not validated. The event information includes temporal information of events and services related to vehicle operation. The temporal information includes advertising of events and services related to vehicle operation and NHTSA information, and intelligent highway and traffic management information. Further, portable electronic devices may be configured by entities to distribute or facilitate use of the event information in enhancing vehicle operations associated with the particular entity.

In addition, the method includes configuring the data block with identification information of the data block, vehicle data information, and hash information of the event information and the data block previously store. The plurality of entities includes at least one of a set of vehicle manufacturers, vehicle technology providers, government agencies, and/or ride sharing services.

In another example, the method includes a computer program product tangibly embodied in a computer-readable storage device and including instructions that when executed by a processor performs a method for appending blockchains in an exchange where the blockchains are used for distributing temporal data to aid in use of a vehicle, the method includes: generating, by a participant of a plurality of participants of the exchange, a block of temporal data relating to vehicle use wherein a consensus of the participants are required to validate the block of temporal data which has been generated prior to distributing the temporal data to other participants. Then, appending the block of temporal data to a blockchain of the exchange upon validation wherein the block data of the blockchain once validated is substantially unalterable, and distributing the block of temporal data which is substantially unalterable to the plurality of participants to aid each participant with respective vehicle use wherein the block of temporal data as a result of being substantially unalterable has a necessary degree of integrity required for a reliance in use by the participant for a vehicle operation.

In addition, the method includes associating the block of temporal data with behavioral competencies for meeting compliance requirements for autonomous or semi-autonomous vehicle operations. The block of temporal data includes data about software compliance in the vehicle operation. The block of temporal data includes data of access to parking, charging stations, and ride queues for use of autonomous or semi-autonomous vehicles. The exchange is configured for aggregate management between a plurality of different participants of the exchange and respective use of vehicles based on the distributing of the block of temporal data. The block of temporal data comprises intelligent highway and traffic management data for use in the vehicle operation. In a third example, a system includes at least one processor; and at least one computer-readable storage device including instructions that when executed causes execution of a method of blockchain data entry to a blockchain exchange for distributing event data to vehicles, the method includes: configuring the event data into block data for entry into the blockchain of the blockchain exchange. Then, configuring the blockchain exchange to validate the block data prior to entry into the blockchain exchange and configuring the blockchain exchange to replicate the block data and distributing the block data to the vehicles associated with the blockchain exchange for use in respective vehicle operations. The event data includes temporal data from intelligent highway and traffic management services.

In addition, the system includes: configuring the blockchain exchange for distributing block data to the plurality of entities which participate in the blockchain exchange for access by each entity. The plurality of entities validates by a consensus the block data prior to entry into the blockchain exchange. The plurality of entities determines whether the block data meets a set of terms already contractually agreed to by the plurality of entities participating in the blockchain exchange when validating the block data. The block data is unchangeable upon validating by the plurality of entities.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, a brief summary or the following detailed description.

Techniques and technologies may be described herein in terms of functional and/or logical block components, and with a reference to symbolic representations of operations, processing tasks, and functions that may be performed by various computing components or devices. Such operations, tasks, and functions are sometimes referred to as being computer-executed, computerized, software-implemented, or computer-implemented. Moreover, the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, references to online may include cloud, server and mobile connectivity type platforms. As used herein, the term module refers to any hardware, software, firmware, electronic control component, processing logic, and/or device, individually or in any combination, including without limitation: application specific integrated circuit (ASIC), an electronic circuit, a module (shared, dedicated, or group) and memory that executes one or more software or firmware programs, a combinational logic circuit, and/or other suitable components that provide the described functionality.

Because of widespread data hacking, the integrity of the data received by autonomous vehicles in operation is significant as serious injury can result when operating autonomous vehicles with compromised data received and used. Moreover, the data received by the autonomous vehicles by the very nature of the visibility of the vehicles and the vehicle use is highly susceptible to intrusions by unauthorized parties. Like the internet, the communication backbone used by such vehicles relies on an open and generally interoperable platform for communicating with multiple parties. Therefore, blockchain technology because of its built-in robustness and inability to be changed once validated by the blockchain exchange participants is deemed a suitable platform for data storage and access by autonomous vehicles. Further, by storing blocks of data that are identical across a network, the blockchain data cannot be changed or lost.

Figure 1:
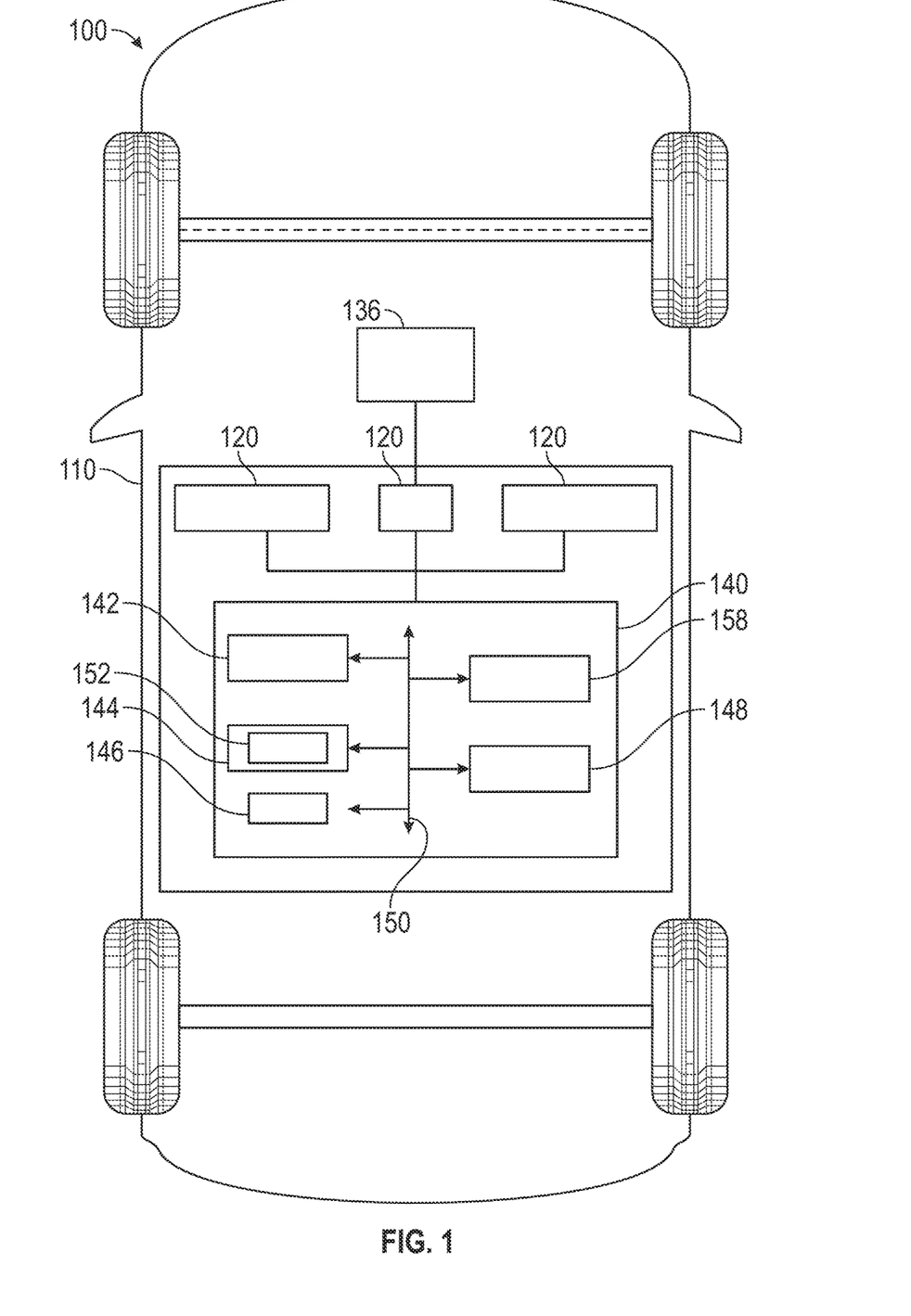
FIG. 1 is a functional block diagram illustrating an exemplary embodiment of a blockchain processor system in a vehicle.

FIG. 1 illustrates an embodiment of an autonomous type of a vehicle 100 for communicating with the blockchain exchange. While it is contemplated that the disclosed subject matter is implemented in systems of an autonomous type of vehicle 100 other ways of deploying the disclosed subject are also feasible. For example, it is entirely possible for the subject matter to be deployed in or integrated in systems or equipment of other types vehicles that may or may not be autonomous or used in hand-held devices such as smart phones or iPads or remote devices such as drones.

With a reference to FIG. 1, the vehicle 100 having a blockchain data processor system 110 is shown in accordance with exemplary embodiments. The vehicle 100 includes a plurality of sensors 120, and a blockchain processor module 140 of the blockchain data processor system 110. The sensors sense observable conditions of the vehicle 100 and can include, but are not limited to, image sensors, LIDAR sensors, and radar sensors. Generally, each sensor of the plurality of sensors is specifically is coupled to the blockchain processor module 140 of the vehicle 100 and configured to sense external surroundings of the vehicle 100. The blockchain processor module 140 receives sensors signals generated by the sensors 120, processes the sensor signals to obtain sensor data, and sends block data to the blockchain exchange (not shown) for further processing. In various embodiments, the blockchain processor module 140 receives temporal event data based on blockchain distributed processing methods and systems disclosed herein. Although the depicted embodiment realizes a platform as a vehicle 100, the concepts presented here can be deployed in other platforms, such as aircraft, spacecraft, watercraft, motorcycles, robots, robotic devices, and the like. Moreover, the concepts presented here may also be deployed in alternative mobile and non-mobile platform applications, if so desired.

As mentioned, the vehicle 100 generally includes a plurality of sensors 120, devices, and software, sufficient for sensing information, converting the sensed information into digital information, and providing the digital information to the blockchain processor module 140 for sending data blocks to blockchain exchange for validation and entry. Generally, each sensor of the plurality of sensors is configured to sense aspects of the surroundings of the vehicle 100.

The processor system may be coupled to a transceiver 136 which may include at least one receiver and at least one transmitter that are operatively coupled to a block data processor 142 for sending block data to the blockchain exchange. Recording the block data at the blockchain exchange is accomplished without any single, central authority; Instead, multiple intermediaries exist in a form of computer servers executing blockchain software. These computer servers form a cloud type network connected via the Internet where entities can potentially join the cloud network and provide in this instance, the temporal event data.

The transceiver 136 can enable the blockchain processor module 140 to establish and maintain the communications links to onboard components and external communication sources, including wireless communication. The transceiver 136 can perform signal processing (e.g., digitizing, data encoding, modulation, etc.) as is known in the art and in this instance for the temporal data received sent and received to the blockchain exchange. In some embodiments, the transceiver 136 is integrated with the blockchain processor module 140.

With continued reference to FIG. 1, the components of the blockchain processor module 140 and their functions are described. In the depicted embodiment, the computer system of the blockchain processor module 140 includes a block data processor 142 communicatively coupled to a memory 144, an interface 146, a storage device 148, a bus 150, and an optional storage disk 158. In various embodiments, the blockchain data processor system 110 (and more specifically, the blockchain processor module 140) performs actions and other functions described further below in connection with FIG. 2. The block data processor 142 performs the computation and control functions attributed to the blockchain processor module 140, and may comprise any type of module or multiple modules, single integrated circuits such as a micro module, or any suitable number of integrated circuit devices and/or circuit boards working in cooperation to carry out the described operations, tasks, and functions by manipulating electrical signals representing data bits at memory locations in the system memory, as well as other processing of signals.

During operation, the block data processor 142 loads and executes one or more programs, algorithms and rules embodied as instructions and applications 152 contained within the memory 144 and, as such, controls the general operation of the control system 130 as well as the computer system of the blockchain processor module 140. In executing the processes described herein, the block data processor 142 loads and executes at least a program 156.

A computer readable storage medium, such as a memory 144, a storage device 148, or an optional storage disk 158 may be utilized as both storage and a scratch pad. The memory locations where data bits are maintained are physical locations that have particular electrical, magnetic, optical, or organic properties corresponding to the data bits. The memory 144 can be any type of suitable computer readable storage medium. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the block data processor 142. In the depicted embodiment, the memory 144 stores the above-referenced instructions and applications 152 along with one or more configurable variables in stored values 154.

The storage device 148 is a computer readable storage medium in the form of any suitable type of storage apparatus, including direct access storage devices such as hard disk drives, flash systems, floppy disk drives and optical disk drives. In one exemplary embodiment, the storage device 148 comprises a program product from which memory 144 can receive a program 156 that executes one or more embodiments of one or more processes of the present disclosure. In another exemplary embodiment, the program product may be directly stored in and/or otherwise accessed by the memory 144 and/or a disk (e.g., optional storage disk 158), such as that referenced below.

The blockchain data records may be stored in the computer readable storage medium, such as the memory 144, the storage device 148, or the optional storage disk 158. The bus 150 serves to transmit programs, data, status and other information or signals between the various components of the computer system of the blockchain processor module 140. The bus 150 can be any suitable physical or logical means of connecting computer systems and components. This includes, but is not limited to, direct hard-wired connections, fiber optics, infrared and wireless bus technologies. During operation, the program 156, stored in the memory 144, is loaded and executed by the block data processor 142.

The interface 146 enables communication within blockchain processor module 140, for example from a system driver and/or another computer system, and can be implemented using any suitable method and apparatus. In one embodiment, the interface 146 obtains data from the sensors 120 and/or from the transceiver 136. The interface 146 can include one or more network interfaces to communicate with other systems or components. The interface 146 may also include one or more network interfaces to communicate with technicians, and/or one or more storage interfaces to connect to storage apparatuses, such as the storage device 148.

Figure 2:
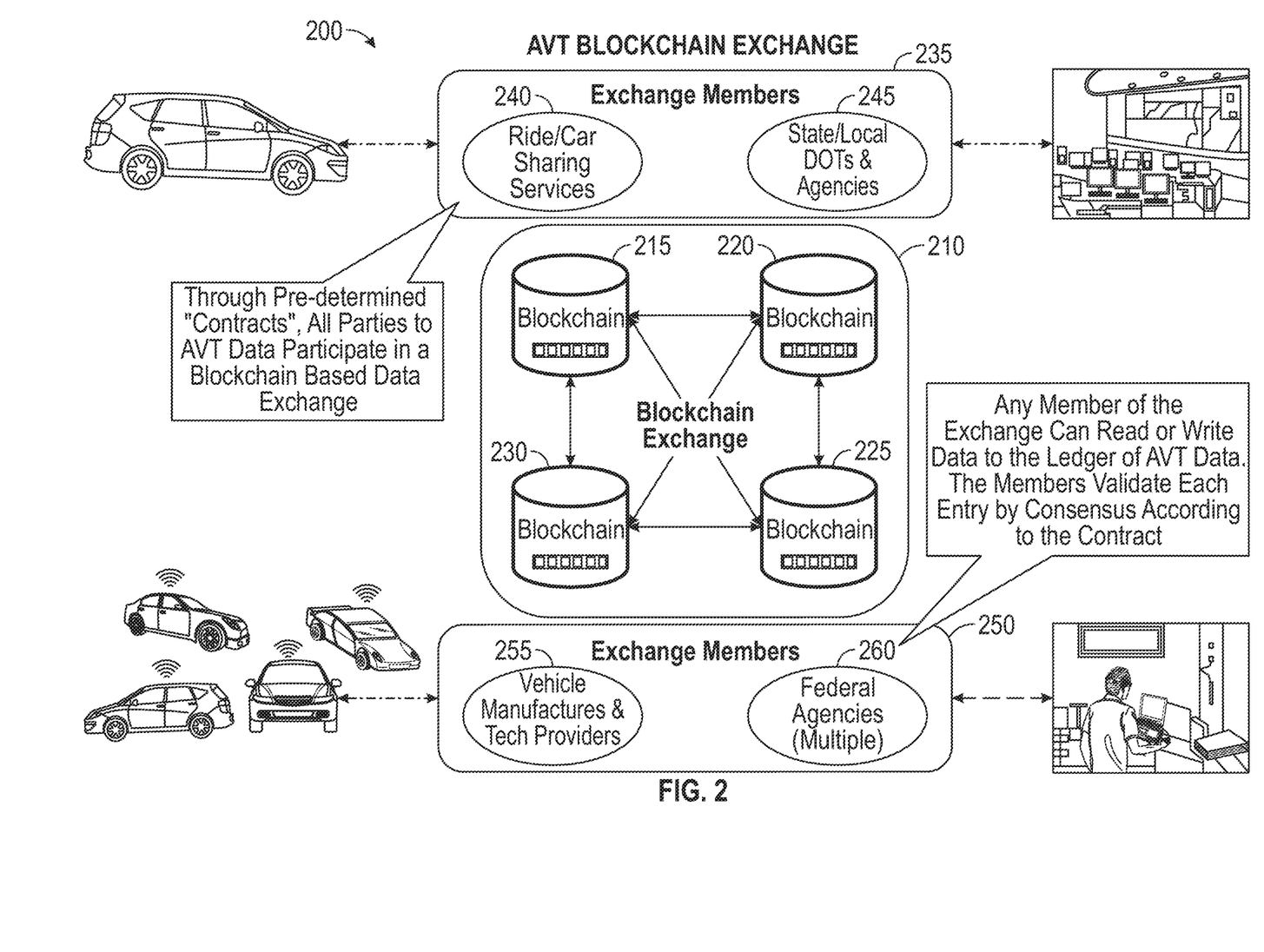
FIG. 2 is functional block diagram illustrating an exemplary embodiment of a blockchain exchange system.

FIG. 2 illustrates an exemplary embodiment of a diagram of a blockchain exchange system having a blockchain exchange 210 which includes a set of blockchain modules. The blockchain modules may also be considered blockchain entities where block data is added to append to each blockchain module. The set of the blockchain modules are designated as nodes and are defined as node 215, node 220, node 225, and node 230. Each of the nodes 215, 220, 225 and 230 are individual blockchain databases which are secure repositories for records of the blockchain data which can additionally have encryption keys to prevent hacking. Attached to the blockchain exchange 210 is a set of exchange member modules of exchange members including an exchange member module 235 and exchange member module 250. The exchange member module 235 includes ride/car sharing services module 240 and state/local DOTs and agencies module 245. The exchange member module 250 includes a vehicle manufacturer and technology provider module 255 and a federal agencies module 260. In addition, advertiser can be added and can be coordinate of like type with service providers (fuel, charge) such as the described ride share services and for proximal parking availability base on location, licensing, permits and in the same fashion have the ability to charge or account for tolls, parking fees etc. This financial component of handling monetary transactions is easily implementable given the blockchain use in monetary transactions but the autonomous vehicle location and self-identification features and the overall system integrations with the added features and subsequent implementations required significant changes. The exchange members of each of the exchange member modules 235, 250 which are participating have the same data available as all the exchange members with each individual access of the databases of the nodes 215, 220, 225 and 230.

In the blockchain exchange 210, through terms set in so called smart contracts all entities to access the block data agree in advance to contractual terms of prescribed in the smart contract. The smart contracts define access and depending on contractual rights of access agreed to between both parties, the entities can participate either in a limited manner or a more active manner in the blockchain exchange 210. The use of smart contracts has value because the instruments allow for easy change of contractual rights of the entities. Further, the smart contracts may allow for more personalization of entity access and can to the different entities need. For example, a government entity likely would have different needs and subsequent access requirements than a vehicle manufacturer or vehicle service entity. Most members or participants of the blockchain exchange 210 have available access rights to read public type temporal data in the blockchain ledger. However, only some of the participants can rights to validate the data to be entered. The participants validate each entry by consensus according to the terms of the smart contract. That is, because each data entry is broadcast to every node 215, 220, 225, 230 of the blockchain exchange 210; every single data entry needs to be verified and properly validated by the consensus. The verification includes ensuring that the participant is providing accurate data and the data is not false or likely to be deemed to have integrity issues. By having more than one or likely a multiple number of participants playing an active role in this consensus decision making; the likelihood of multiple participants being hoodwinked and allowing inaccurate data to be validated is greatly reduced. Participants who have validation rights are called minor and those who do not are called non-minors. In addition, since each participant who is a minor has validation authority, individual motivations or desires of a singular participant have little effect in the validation decision and the overall trustworthiness of the verification process is increased because of the consensus system of validation. Further, the validation step prevents outsiders from hacking or inserting bad or inaccurate data which can interrupt or cause other serious damage to the integrity of the exchange as there are simply by the number of participant multiple checks of the data. Once the data to be added to the ledger is validated i.e. approved by the blockchain exchange 210, the data or block data is designated by the system to be unchangeable and unalterable i.e. the block data which is added or appended to an individual record of a blockchain of a blockchain database within the blockchain exchange 210 is permanent.

In addition, there may be multiple types of data within the data blocks of the blockchain exchange 210 which because of the flexibility of the blockchain data structure can easily be configured into the data blocks are in this instance are generally of temporal driving related events. These temporal driving related events allow for compliance with NHTSA requirements for autonomous and semi-autonomous vehicle use. There is also a set of multiple NHTSA identified events that are associated with the set of requirements for autonomous and semi-autonomous vehicle operations, in this case for example there are twenty-eight, behavioral competencies for vehicle operation and temporal data distributed by the blockchain exchange assists in meeting these behavioral competencies. In other words, the NHTSA use of the behavioral competencies are an attempt to bring consistency and a level of assurance of autonomous and semi-autonomous vehicle behavior in response to various events. The temporal data made available through the blockchain exchange 210 may provide additional information about the events which in turn enhances vehicle performance and operation i.e. competency and compliance with the behavioral competences required.

Further, as some of the competencies involve vehicle sensor capabilities for object and event detection and subsequent response (OEDR); as mentioned additional temporal data distributed by the blockchain exchange makes for better object and event detection by the vehicle. Also, the competencies for event related items may be needed to be retained permanently and the blockchain database of records in the blockchain exchange provides a suitable repository for permanently retaining copies of this event data and keeping an unalterable record which can be used for future checks and verification that the participants associated vehicle meets the required competencies.

In addition, more data types can be added for recording in the blockchain and may include the vehicle operation status and the vehicle software compliance validations data types may include data types of updates and the current version as well as uncompromised versions with enhanced firewall or encryption protections (i.e. to prevent hacking). Also, there may be data types associated with vehicle identification and authorization as well as data types for requests for access to resources which may include parking, charging and ride queues. Finally, a set of data types may be designated for the intended operational design domain (IODD) and vehicles autonomous capability levels which are scaled by the NHTSA.

Further, the twenty-eight behavioral competences required which can be associated with the blockchain records are listed below as follows:

Behavioral Competencies

Figure 3:
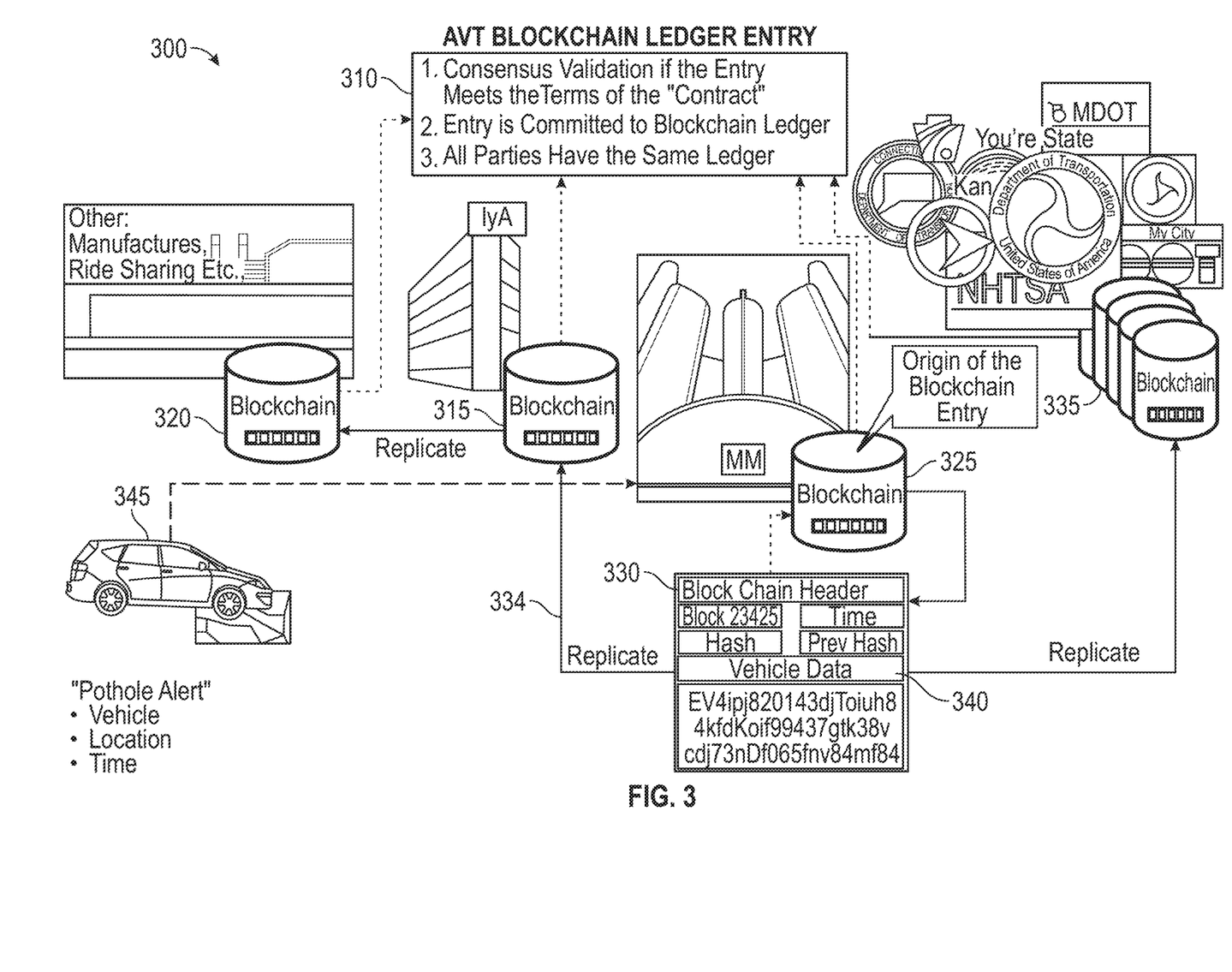
FIG. 3 is a functional diagram illustrating an exemplary embodiment of the blockchain system flow.
Figure 4A:
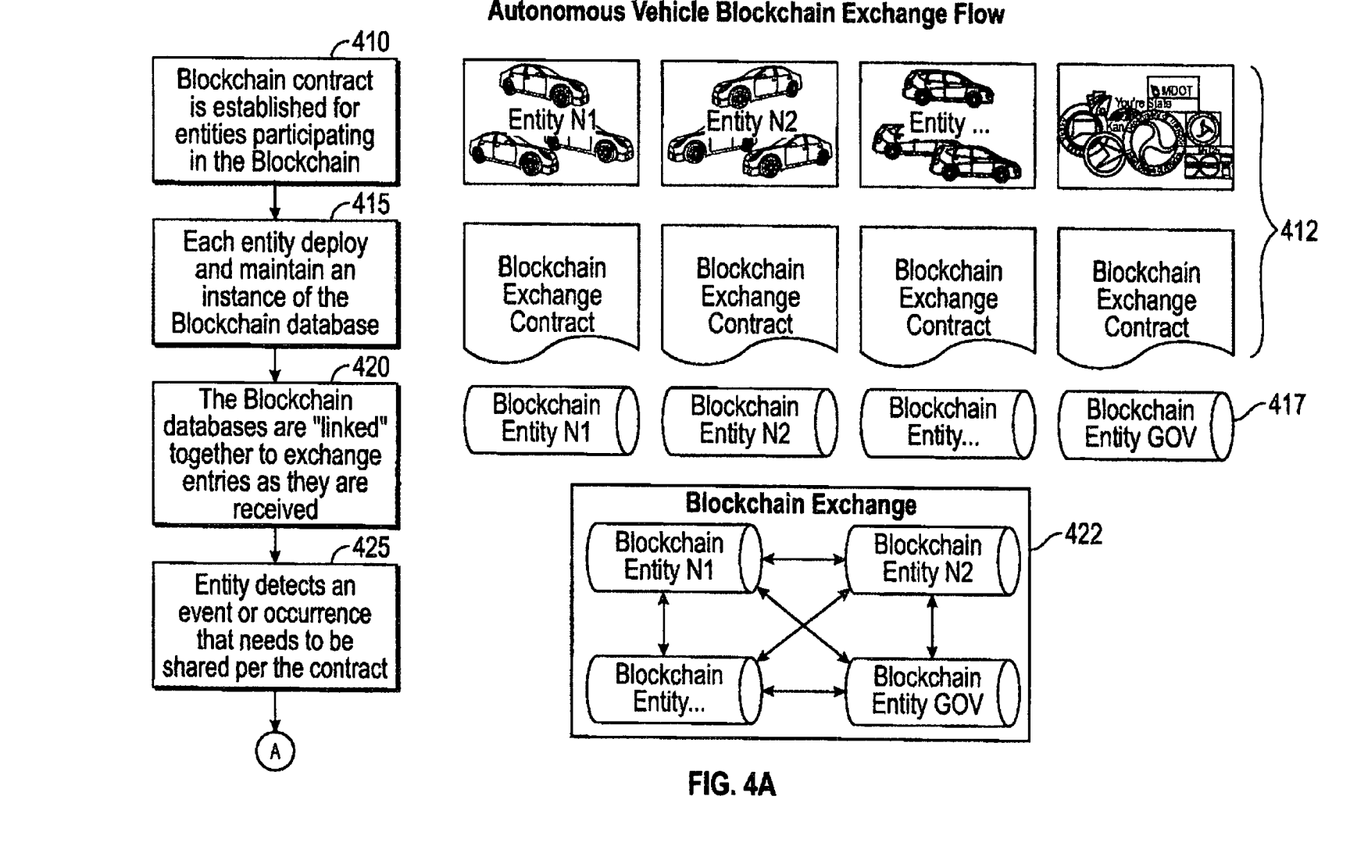
FIGS. 4A, 4B, 4C, and 4D are diagrams illustrating exemplary embodiments of the blockchain system flow.
Figure 4B:
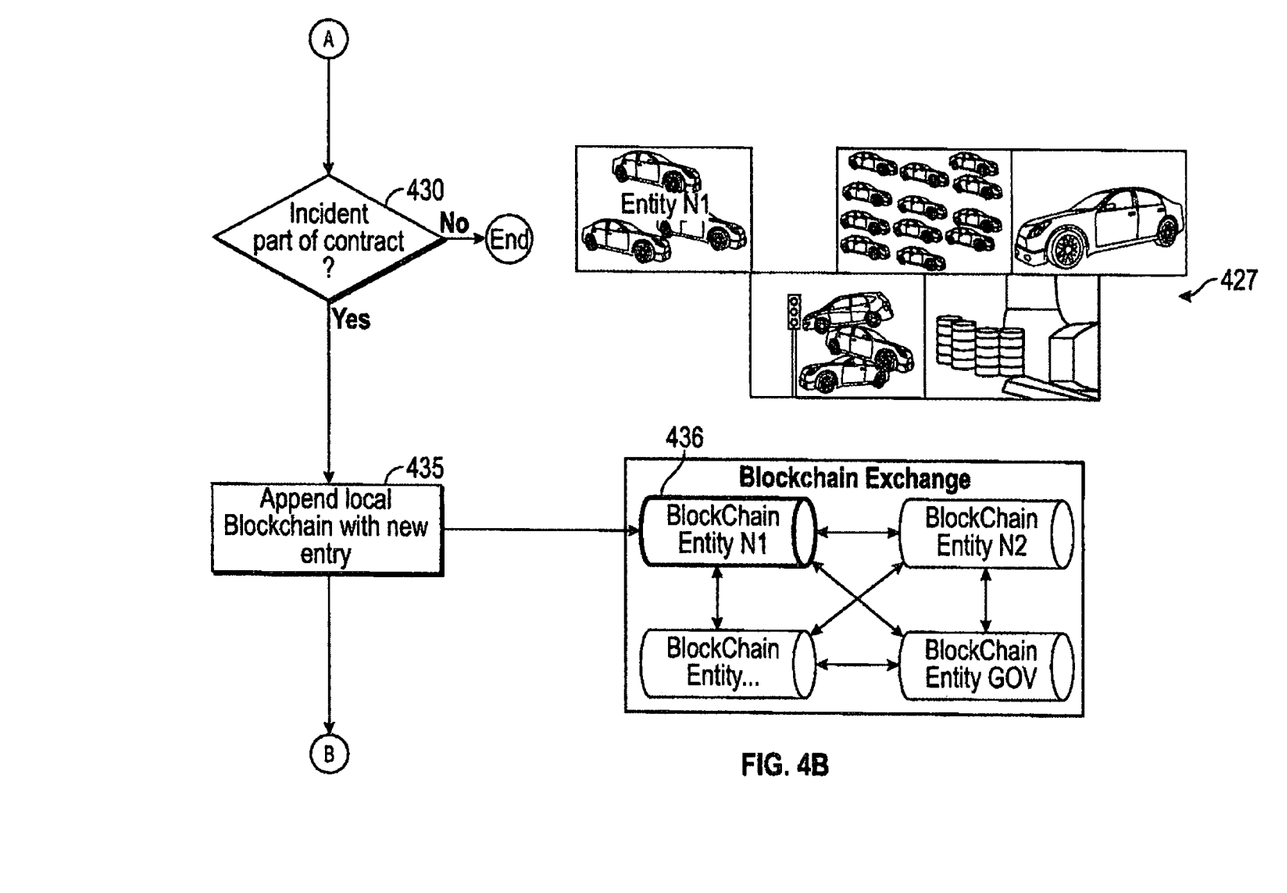
Figure 4C:
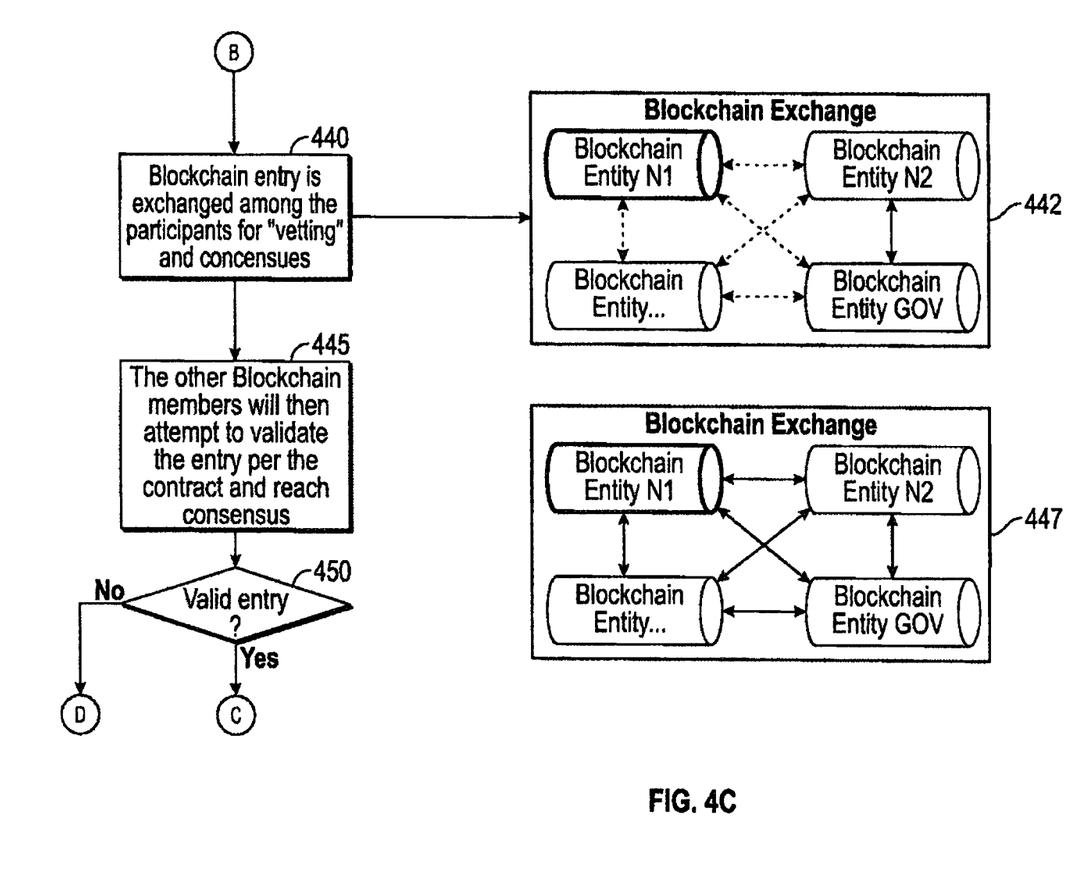
Figure 4D:
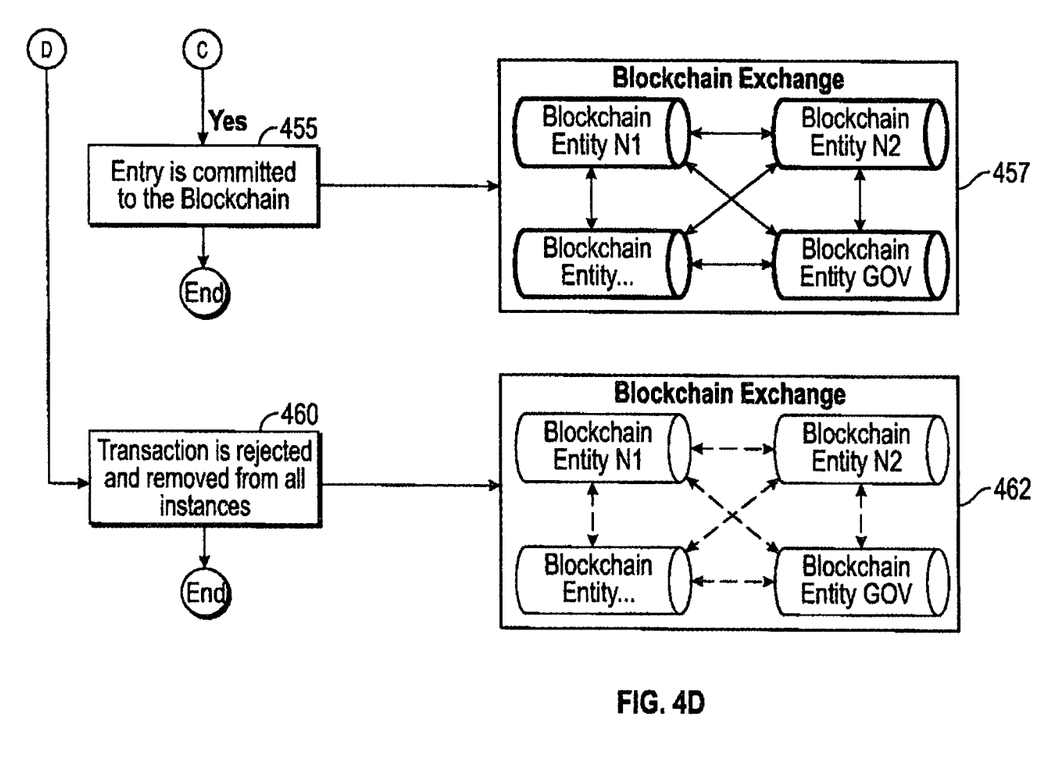

1. Detect and respond to speed limit changes and speed advisories
2. Perform high-speed merge operation (e.g., merging onto the freeway)
3. Perform a low-speed merge operation
4. Move out of a travel lane and park the vehicle (e.g., park the vehicle in the shoulder area as a location of minimal risk)
5. Detect and respond to encroaching oncoming vehicles
6. Detect passing and no passing zones when operating and perform passing maneuvers in the appropriate zones
7. Perform operations properly when following vehicles (i.e. stopping and going at appropriate times and distances)
8. Detect and respond to stopped vehicles during vehicle operations
9. Detect and respond to lane changes of other vehicles
10. Detect and respond to static obstacles in the path of the vehicle
11. Detect traffic signals and stop/yield signs
12. Respond appropriately to traffic signals and stop/yield Signs
13. Navigate intersections and perform turns appropriately in intersections
14. Navigate roundabouts and traffic circles
15. Navigate a parking lot and locate spaces for parking
16. Detect and respond to access restrictions (i.e. signage such as one-way, no turn, ramps, etc.)
17. Detect and respond to work zones and persons directing traffic in unplanned or planned events
18. Make appropriate automated right-of-way decisions based on surroundings
19. Follow local and State driving laws and regulations
20. Follow Police/First Responder controlling traffic (Overriding or Acting as Traffic Control Device)
21. Follow construction zone workers controlling traffic patterns (Slow/Stop Sign Holders).
22. Respond to citizens directing traffic after a collusion or another obstacle
23. Detect and respond to Temporary Traffic Control Devices
24. Detect and respond to Emergency Vehicles
25. Yield to Law Enforcement, EMT, Fire, and other Emergency Vehicles at intersections, junctions, and other traffic controlled situations
26. Yield to pedestrians and bicyclists at intersections and crosswalks
27. Provide safe distances from vehicles, pedestrians, skateboarders, roller-bladders, bicyclists, dogs etc. on the side of the road
28. Detect and respond to detours and/or other temporary changes in traffic patterns FIG. 3 illustrates a blockchain exchange with a ledger entry for adding data blocks to the blockchain ledger. The blockchain ledger entry is alternatively referred to as the adding of blockchains to the blockchain database. Adding blocks to an individual blockchain or the ledger or database is referred to as mining. In the blockchain ledger, the entry process includes a three-step process of executed by processing module 310 of a consensus validation if the entry meets the terms of the contract, the entry is then committed to the blockchain ledger and all parties have the same ledger. This process is illustrated at the origination of the blockchain 325 which includes the blockchain hash 300 and the vehicle data 340.

The benefits of the blockchain ledger use and data entry are multi-fold and are the result of data redundancies, validation processes, fixed unalterable recordation of the data, transparency of the records, obstacles to unauthorized data entry, prioritization of participants, and advance notification features. The benefits of using blockchain technology in vehicles may include the following list:

Benefits

1. Allows for liability reduction and resolution processes based on data in the blockchain.
2. A nearly irrefutable public record created by the blockchain.
3. All entries of temporal data are vetted by consensus upon entry into the blockchain ledger.
4. There is built in resiliency in the blockchain data structure
5. Multiple instances of the complete data record are assigned to different members of the blockchain exchange so protect the record.
6. Transparency and visibility for government entities: DOTs. NHTSA, local road commissions
7. There is security from hacking by using a substantially unchangeable data structure.
8. Rogue players or unidentified $3^{rd}$ parties must pass consensus validation from the members as a check to entrance into the blockchain exchange.
9. The Blockchain record is difficult to alter even if penetrated.
10. Data in the blockchain may be viewed in aggregate and is available "real time" to the members of the blockchain exchange.
11. The data in the blockchain is location independent and can be accessible to manage location and densities of vehicular traffic.

12. The blockchain exchange allows for a convenient mechanism for enforcing licensing or franchise rights when distributed.
13. Geo-fencing based on intended operation design domain IODD or a licensing model can be designated for levels of autonomous or semi-autonomous vehicle operations.
14. Prioritization of vehicle access can be designated by the data of the blockchain and respective vehicles.
15. Interaction with an intelligent highway and traffic management systems is easily implemented by member participation in the blockchain exchange.
16. Interaction with various local licensing and permitting authorities is easily implemented.
17. The ability to self-identify with location and participate allows disparate service providers for fueling, parking, toll based services, and advertising to reach vehicles in proximity of those services.
18. The blockchain allows for a mechanism for a secure advance notification system for emergency vehicle access needs (Police, ambulance, firetruck, etc.)
19. Prevents unauthorized entities from interjecting false signals into the traffic management system At 345, an entity participating in the blockchain exchange sends data which in instances maybe known as block data to the blockchain exchange for entry. In an exemplary embodiment, the data may be sensor data from a vehicle of a pothole and may include ancillary data derived from the vehicle sensors of vehicle location, time and imagery of the pothole. The vehicle in the exemplary embodiment participates as the vehicle owner or manufacturer has executed a smart contract agreement with the blockchain exchange. The data or block is then reviewed by participants of the blockchain 325 who by consensus either validate or not the data to be appended to the blockchain. The block of data to be appended is the data block 330 which includes the packet header information 334 identifying the block, time of entry, and an associated hash which is a unique identifier that identifies the data block in relation to the previous data block added. In other words, because the hash is based on the previous hash and in addition ties each data block together the hash is unique. Further, by the reference to a previous data block by the previous hash, which is a hash of the previous block header; this reference connects each data block to the parent of the data block, and therefore by induction to all previous data blocks. The header items are hashed into the data block hash, which allows for proof that the other parts of the header have not been changed, and this hash is also used as a reference by the succeeding data block.

The other pertinent part of the data block 330 is the payload which is designated as the vehicle data 340. In this particular case, the identifier is information of the vehicle generating the data block 330. However, the payload is not simply limited to the vehicle data but may include other data or even ancillary data. In an exemplary embodiment, the data maybe ancillary data from other sources which may include data from third parties, data generated by processing or artificial intelligence or machine learning techniques. The data block 330 is then distributed to the other databases where the data block 330 is replicated in database 315 and database 335. The data block 330 may be additionally replicated in additional connected databases 320. In an exemplary embodiment, the connected database 320 and the other databases may be deployed in a network database configuration of multi-tenant connected databases where each participant has access to various tenant databases storing the data block 330 in blockchains.

FIGS. 4A, 4B, 4C, and 4D illustrate the blockchain flow between each of the blockchain entities according to exemplary embodiments. In FIGS. 4A, 4B, 4C and 4D, at 410, a blockchain contract is established for entities 412 participating in the blockchain. Each of the entities 412 of N1-N4 executes a blockchain contract. At 415, each entity deploys and maintain an instance of the blockchain databases 417 of the blockchain entities N1-N4. At 420, the blockchain databases 417 of the entities N1-N4 are linked together to exchange entries upon receipt in the blockchain exchange 422. At 425, the entities detect an event or occurrence which requires sharing among other entities per the contract. In an exemplary embodiment, the events 427 which are generally temporal events that are subject to change in instances for the better or for the worse and may include traffic collisions, road works, traffic jams or slow moving traffic, and road damage such as potholes. It is contemplated that the events include a plethora of events related directly or indirectly related to the use of the autonomous or non-autonomous vehicle. For example, events indirectly related may include advertisements based on vehicle use or location or even passenger profile information which can be added as or inserted with the blockchain entries. Users pursuant to the blockchain exchange contract may have options to select the types of advertising or not select any advertising. In alternate embodiments, users may provide sensor or other types of data to the blockchain exchange intermittently or continuously in exchange, in instances, for waivers of subscription fees or more individual services and promotions. In other words, by permitting and agreements agreed to by the participants are variety of service, advertising and monetary models can be developed in conjunction with the blockchain entries.

At 430, a determination is made by application solutions associated with the blockchain exchange as to whether the detected event or occurrence qualifies as an incident as defined by the blockchain exchange contract. If the determination is negative than the flow reverts to 425 and continues to detect for other events or incidents. If the determination is positive and the incident is part of the blockchain exchange contract, then at 435 the blockchain exchange at 436 is appended. That is, the local blockchain entity N1 of the blockchain exchange at 436 is appended with a new entry to be added to the blockchains of the other entities N2-N4 of the blockchain exchange. At 440, the blockchain entry is exchanged about the participants for vetting and consensus validation. While all the participants of the blockchain exchange 442 have read access to the entries in the blockchain entry or what is considered non-minor access, a smaller number of the participants have minor access which is the ability to validate ledger entries. The use of validation by a consensus of participants prior to a block being added to the blockchain ledger is a barrier to false incidents being added and the integrity of the data being corrupted. Additionally, since the blockchain entries once added cannot be modified and each of the blocks added uses unique signature identification based on the prior block added, any false or corrupt entries can easily be traced to the source and prevented from being added in the future.

At 445, the other blockchain members will either validate or not the entry per the rules or definitions of the obligations under the contract which the participant has executed. At 447, the blockchain entity N1-N2 as well as the government entity review the entries for a consensus validation. At 450, a determination on a case by case basis is made as to whether an entry is valid. If the entry is deemed not valid, the entry or transaction is removed and rejected at 460; in addition, all instances of the same type of entry may be removed to protect the overall data integrity of the blockchain. A table or other data structure is updated with the rejected data for future checks and the block exchange remains unchanged at 462. The flow subsequently reverts to the detection step at 425. If the entry is validated, the block is added or committed at 455 to the blockchain exchange at 457.

Figure 5:
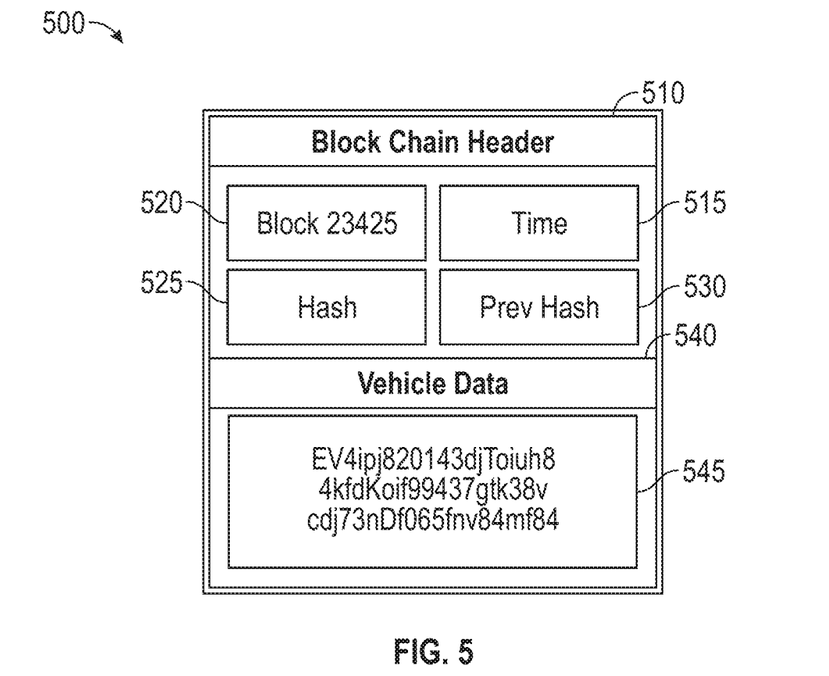
FIG. 5 is a schematic diagram illustrating an exemplary embodiment of a data block of a blockchain system.

FIG. 5 illustrates a diagram of a data block of a blockchain in accordance with an embodiment. The data block 500 as previously mentioned includes the blockchain header 510 and the vehicle data 540. The hash 525 includes all the blockchain header 510 data. Additionally, as the blockchain header 510 includes the data of the previous hash 530, if a block of a parent in a prior entry requires a modification all the following added blocks and hashes need to be changed because all the subsequent hashes are linked together by the block chain header 510 information. Hence, any change in a particular data block 500 of the blockchain requires changes throughout the entire subsequent pipeline. Therefore, if the blockchain exchange were to be hacked, the hacker would not be able to modify a particular data block 500 without subsequent data block modifications and validations. In other words, because of the subsequent validations for the change, a hacker could not change the data as the hacker would not be able to receive consensus validation from the participants for all the changes easily. The vehicle data 540 includes the payload 545. However, the descriptor of the vehicle data 540 and data type of the payload could be modified to additional types of data and not simply vehicle data. In exemplary embodiments, the data may include advertising, meta-data, machine data, artificial intelligence generated data and other types of event related data that could be added into the blockchain.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments.

It should be generally understood that various changes can be made in the function and arrangement of elements without departing from the scope defined by the claims, which includes known equivalents and foreseeable equivalents at the time of filing this patent application.

What is claimed is:

1. A system for administering vehicle event information and verification usable by a plurality of different entities each having different roles and each employing at least one computing device capable of networked communications, comprising:
    a primary blockchain exchange configured for permissioned use by the plurality of different entities comprising event information via networked communications;
    a set of a plurality of secondary blockchain exchanges linked to the primary blockchain exchange for permissioned use by a set of vehicles wherein the secondary blockchain exchanges are associated with each entity to receive event information wherein the event information comprises temporal information of events and services related to vehicle operation for the set of vehicles;
    the primary blockchain exchange storing at least one deployable workflow as a data structure specifying vehicle events and verification-related activities and associated validation rules to be performed by at least selected ones of the plurality of different entities;
    the set of a plurality of secondary blockchain exchanges storing at least one deployable workflow as a data structure specifying vehicle data, and time;
    a primary blockchain ledger deployed across the plurality of different entities and hosted at least in part by the at least one computing device of each of the plurality of different entities wherein the primary blockchain ledger contains information from blockchain agreements executed between the plurality of entities about permissioned use for access between entities;
    a secondary blockchain ledger deployed across the set of vehicles and hosted in part by the at least one computing device of each of the vehicle wherein the secondary blockchain ledger contains permissioned use for access to the primary blockchain ledger as determined by the executed blockchain agreements between the entities wherein the permissioned use comprises read access only;
    wherein each entity participating in the primary blockchain exchange distributes event information related to the vehicle operation for each set of vehicles wherein the primary blockchain exchange includes a plurality of databases comprising blockchains of data blocks for storing the event information;
    wherein a particular entity of the plurality of entities, generates the event information related to vehicle operation for each set of vehicles and is enabled with permission use to access the primary blockchain ledger and store the event information to the primary blockchain ledger via a data block for entry into the secondary blockchain exchange;
    wherein the event information is validated by a consensus of the plurality of entities participating in the primary blockchain exchange prior to entry into the secondary blockchain exchange; and
    in response to a validation by the consensus, a data block containing the temporal information of the event information is added to the secondary blockchain ledger for read access by the set of vehicles wherein the temporal information comprises road and traffic information,
    wherein at least one entity having permissioned use to access the primary blockchain exchange is a government agency responsible for transportation safety that is capable of identifying the temporal event.

2. The system of claim 1, comprising:
    in response to an invalidation of an event by consensus, the primary blockchain exchange configured to remove the temporal information from the primary blockchain ledger which also results in removal of propagated data blocks containing the temporal information in a secondary blockchain ledger.

3. The system of claim 1, further comprising:
    the primary blockchain exchange configured to provide via permissioned read access to the primary blockchain ledger a set of behavioral competences to the secondary blockchain exchange to ensure compliance by the set of vehicles wherein the compliance is for both autonomous and semi-autonomous vehicle behavior.

4. The system of claim 3, wherein the behavior competencies comprise a set of about twenty-eight behavioral competencies.

5. The system of claim 3, wherein the set of behavioral competencies comprises at least one behavioral competence of a set of behavior actions comprising to detect speed limit changes and speed advisories, to perform low and high speed merge, to detect passing zones, to detect traffic signals, and to detect work zones.

6. The system of claim 3, further comprising:
a data block of the secondary blockchain ledger configured into a set of parts that comprise identification information, vehicle data information and prior event information wherein the prior event information is configured in a hash to link a prior block of the secondary block chain.

7. The system of claim 1, further comprising:
the primary blockchain exchange configured to communicate with at least one portable device wherein the portable device is configured with at least permission use for read access to the temporal information in the primary blockchain ledger.

8. The system of claim 1, wherein the plurality of entities comprises at least one of a set of vehicle manufacturers, vehicle technology providers, government agencies, and/or ride sharing services.

9. A computer program product tangibly embodied in a computer-readable storage device that comprises a set of instructions that when executed by a processor distributes event information from a primary blockchain exchange to at least one secondary blockchain exchange, the processor performing the steps of:
configuring a primary blockchain exchange for permissioned use by a plurality of different entities comprising event information via networked communications;
linking a set of a plurality of secondary blockchain exchanges to the primary blockchain exchange for permissioned use by a set of vehicles wherein the secondary blockchain exchanges are associated with each entity to receive event information wherein the event information comprises temporal information of events and services related to vehicle operation for the set of vehicles;
storing by the primary blockchain exchange via at least one deployable workflow in a data structure, a set of vehicle events and verification-related activities and a set of associated validation rules to be performed by at least one of the plurality of different entities;
storing by at least one of the secondary blockchain exchanges via at least one deployable workflow in a data structure, vehicle data and time;
deploying a primary block chain ledger across the plurality of different entities and hosted at least in part by the at least one processor of each of the plurality of different entities wherein the primary block chain ledger contains information from blockchain agreements executed between the plurality of entities about permissioned use for access between entities;
deploying a secondary blockchain ledger deployed across the set of vehicles and hosted in part by the at least one processor of each of the vehicle wherein the secondary blockchain ledger contains permissioned use for access to the primary blockchain ledger determined by the executed blockchain agreements between the entities wherein the permissioned use comprises read access only;
wherein each entity participating in the primary blockchain exchange distributes event information related to the vehicle operation for each set of vehicles wherein the primary blockchain exchange includes a plurality of databases comprising blockchains of data blocks for storing the event information;
wherein a particular entity of the plurality of entities, generates the event information related to vehicle operation for each set of vehicles and is enabled with permission use to access the primary blockchain ledger and store the event information to the primary blockchain ledger via a data block for entry into the secondary blockchain exchange;
wherein the event information is validated by a consensus of the plurality of entities participating in the primary blockchain exchange prior to entry into the secondary blockchain exchange; and
in response to a validation by the consensus, adding a data block containing the temporal information of the event information to the secondary blockchain ledger for read access by the set of vehicles wherein the temporal information comprises road and traffic information;
wherein at least one entity having permissioned use to access the primary blockchain exchange is a government agency responsible for transportation safety that is capable of identifying the temporal event.

10. The method of claim 9, the processor further performing the step of:
in response to an invalidation of an event by consensus, configuring the primary blockchain exchange to remove the temporal information from the primary blockchain ledger which also results in removal of propagated data blocks containing the temporal information in a secondary blockchain ledger.

11. The computer program of claim 9, the processor further performing the step of:
configuring the primary blockchain exchange to provide via permissioned read access to the primary blockchain ledger a set of behavioral competences to the secondary blockchain exchange to ensure compliance by the set of vehicles wherein the compliance is for both autonomous and semi-autonomous vehicle behavior.

12. The computer program of claim 11, wherein the behavior competencies comprise a set of about twenty-eight behavioral competencies.

13. The computer program of claim 12, wherein the set of behavioral competencies comprise at least one behavioral competence of a set of behavior actions comprising to detect speed limit changes and speed advisories, to perform low and high speed merge, to detect passing zones, to detect traffic signals, and to detect work zones.

14. The computer program of claim 9, the processor further performing the step of:
configuring the primary blockchain exchange to communicate with at least one portable device wherein the portable device is configured with at least permission use for read access to the temporal information in the primary blockchain ledger.

15. A system comprising:
at least one processor; and
at least one computer-readable storage device comprising instructions that when executed causes execution of a method of blockchain data entry to a blockchain exchange for distributing event data to vehicles, the at least one processor configured to:
permission a primary blockchain exchange for use by a plurality of different entities comprising event information via networked communications;
link a set of a plurality of secondary blockchain exchanges to the primary blockchain exchange for permissioned use by a set of vehicles wherein the secondary blockchain exchanges are associated with each entity to receive event information wherein the event information comprises temporal information of events and services related to vehicle operation for the set of vehicles;

store by the primary blockchain exchange via at least one deployable workflow in a data structure, a set of vehicle events and verification-related activities and a set of associated validation rules to be performed by at least one of the plurality of different entities;

store by at least one of the secondary blockchain exchanges via at least one deployable workflow in a data structure, vehicle data and time;

deploy a primary block chain ledger across the plurality of different entities and hosted at least in part by the at least one processor of each of the plurality of different entities wherein the primary block chain ledger contains information from blockchain agreements executed between the plurality of entities about permissioned use for access between entities;

deploy a secondary blockchain ledger deployed across the set of vehicles and hosted in part by the at least one processor of each of the vehicle wherein the secondary blockchain ledger contains permissioned use for access to the primary blockchain ledger determined by the executed blockchain agreements between the entities wherein the permissioned use comprises read access only;

wherein each entity participating in the primary blockchain exchange distributes event information related to the vehicle operation for each set of vehicles wherein the primary blockchain exchange includes a plurality of databases comprising blockchains of data blocks for storing the event information;

wherein a particular entity of the plurality of entities, generates the event information related to vehicle operation for each set of vehicles and is enabled with permission use to access the primary blockchain ledger and store the event information to the primary blockchain ledger via a data block for entry into the secondary blockchain exchange;

wherein the event information is validated by a consensus of the plurality of entities participating in the primary blockchain exchange prior to entry into the secondary blockchain exchange; and in response to a validation by the consensus, add a data block containing the temporal information of the event information to the secondary blockchain ledger for read access by the set of vehicles wherein the temporal information comprises road and traffic information;

wherein at least one entity having permissioned use to access the primary blockchain exchange is a government agency responsible for transportation safety that is capable of identifying the temporal event.

16. The system of claim 15, the at least one processor further configured to:
in response to an invalidation of an event by consensus, remove the temporal information from the primary blockchain exchange which results in removal of propagated data blocks containing the temporal information in a secondary blockchain ledger.

17. The system of claim 15, the at least one processor further configured to:
provide via permissioned read access to the primary blockchain ledger a set of behavioral competences to the secondary blockchain exchange to ensure compliance by the set of vehicles.

18. The system of claim 17, wherein the behavior competencies comprise a set of about twenty-eight behavioral competencies.

19. The system of claim 18, wherein the set of behavioral competencies comprises at least one behavioral competence of a set of behavior actions comprising to detect speed limit changes and speed advisories, to perform low and high speed merge, to detect passing zones, to detect traffic signals, and to detect work zones.

20. The system of claim 19, the at least on processor further configured to:
communicate between the primary blockchain exchange and at least one portable device wherein the portable device is configured with at least permission use for read access to the temporal information in the primary blockchain ledger.

* * * * *